United States Patent
Tommasi et al.

(10) Patent No.: US 12,242,633 B2
(45) Date of Patent: Mar. 4, 2025

(54) REGULATION BASED PROTECTION OF DATA FOR STORAGE SYSTEMS

(71) Applicant: INTERNATIONAL BUSINESS MACHINES CORPORATION, Armonk, NY (US)

(72) Inventors: Pierpaolo Tommasi, Dublin (IE); Marco Simioni, Dublin (IE); Stephane Deparis, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 17/658,797

(22) Filed: Apr. 11, 2022

(65) Prior Publication Data
US 2023/0325523 A1    Oct. 12, 2023

(51) Int. Cl.
G06F 21/62    (2013.01)

(52) U.S. Cl.
CPC .................. G06F 21/6227 (2013.01)

(58) Field of Classification Search
None
See application file for complete search history.

(56) References Cited

U.S. PATENT DOCUMENTS

| | | | |
|---|---|---|---|
| 7,082,456 B2 * | 7/2006 | Mani-Meitav | H04L 67/01 709/219 |
| 7,243,097 B1 * | 7/2007 | Agrawal | G06F 16/2452 |
| 7,748,027 B2 | 6/2010 | Patrick | |
| 9,275,065 B1 * | 3/2016 | Ganesh | G06F 21/556 |
| 9,760,075 B2 | 9/2017 | Peterson et al. | |
| 10,223,523 B2 | 3/2019 | Fram | |
| 10,726,148 B2 * | 7/2020 | Hughes | G16H 10/60 |
| 10,853,329 B2 | 12/2020 | Thereska et al. | |
| 11,023,615 B2 | 6/2021 | Larson et al. | |
| 2009/0300002 A1 * | 12/2009 | Thomas | G06F 16/2457 707/999.005 |
| 2015/0271666 A1 * | 9/2015 | Arunachalam | H04W 12/02 455/410 |
| 2018/0018590 A1 * | 1/2018 | Szeto | G16H 50/20 |
| 2020/0327252 A1 | 10/2020 | McFall et al. | |
| 2020/0389495 A1 | 12/2020 | Crabtree et al. | |
| 2021/0248252 A1 * | 8/2021 | Darji | G06F 3/065 |

FOREIGN PATENT DOCUMENTS

EP    1089200 A2 *    4/2001    ....... G06F 17/30525

OTHER PUBLICATIONS

Celdran et al., "Protector: Towards the protection of sensitive data in Europe and the US," Computer Networks 181, DOI:10.1016/j.comnet.2020.107448, 2020, 25 pages.

(Continued)

*Primary Examiner* — Fatoumata Traore
(74) *Attorney, Agent, or Firm* — Michael O'Keefe (57) ABSTRACT

Embodiments for providing enhanced data protection for storage systems in a computing environment by a processor. One or more queries received by a storage system may be identified. Approval or denial of transmission of data with the storage system may be regulated in relation to the one or more queries based a queried metadata and a plurality of rules and administrative policies.

18 Claims, 6 Drawing Sheets

(56) References Cited

OTHER PUBLICATIONS

Istvan et al., "Software-Defined Data Protection: Low Overhead Policy Compliance at the Storage Layer is Within Reach!," Proceedings of the VLDB Endowment 14, No. 7 (2021): 1167-1174. (8 pages).
Ardagna et al., "Privacy-enhanced Location-based Access Control", Handbook of Database Security, pp. 531-552, Mar. 2007, DOI:10.1007/978-0-387-48533-1_22, (22 pages).
Sanchez Navarro, Francisco, "Location based service restrictions for Android devices", Bachelor Thesis, University of Madrid, Computer Engineering, Feb. 2012/2013, (114 pages).
Mokbel, Mohamed F., "Towards Privacy-Aware Location-Based Database Servers", 22nd International Conference on Data Engineering Workshops (ICDEW'06), 2006, pp. 93-93, DOI: 10.1109/ICDEW.2006.152 (10 pages).
Wikipedia, "Geo-blocking", https://en.wikipedia.org/wiki/Geo-blocking, Accessed on Apr. 11, 2022, (8 pages).

\* cited by examiner

REGULATION BASED PROTECTION OF DATA FOR STORAGE SYSTEMS

BACKGROUND

The present invention relates in general to computing systems, and more particularly, to various embodiments for providing regulation-based protection of data for storage systems in a computing environment using a computing processor.

SUMMARY

According to an embodiment of the present invention, a method for providing enhanced data protection for storage systems in a computing environment, by one or more processors, is depicted. One or more queries received by a storage system may be identified. Approval or denial of transmission of data with the storage system may be regulated in relation to the one or more queries based a queried metadata and a plurality of rules and administrative policies.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

DETAILED DESCRIPTION OF THE DRAWINGS

In recent years, people have been witnessing a data explosion with data being estimated in the order of zettabytes. Analysing this wealth and volume of data offers remarkable opportunities for growth in various industries and sectors (of types of entities (e.g., companies, governments, academic institutions, organizations, etc.). However, the majority of these datasets (e.g., healthcare data, telecommunication data, banking data, etc.) are proprietary and many contain personal (e.g., personal identifiable information "PII"), sensitive personal Information ("SPI"), and/or business sensitive information. Examples of sensitive data include patient records, special housing information, tax records, governmental issued identification numbers (e.g., social security number), banking/financial data numbers (e.g., a bank account number, credit/debit card numbers, etc.), customer purchase records, academic records, mobile call detail records (CDR), etc. Moreover, depending on a specific region or jurisdiction, some types of data may be considered protected or "classified" while other data may be considered unprotected or "unclassified." The various types of data is often considered as private and confidential and should be protected from access by unauthorized users.

Moreover, privacy and regulation compliance are important concerns for users/administrators, entities (e.g., businesses, institutions, organizations, etc.), regions, sovereignties, cultures, agencies, and/or government and enterprises. It is quite common for application databases to store personal and sensitive data, and to have such data accessed by several actors with different purposes and from different locations. Datasets may include sensitive data, which is regulated on a per-country granularity (data governance laws might be different even within the same country).

Currently, when dealing with sensitive data, common approaches include enforcing use of a virtual private network ("VPN"), enforcing usage through remote desktop connections, boldly geo-blocking full areas, using strict access controls or materialized views. These approaches greatly limit the freedom of data science for the sake of security and compliance. Generally, ensuring regulation adherence is more a legal than technical issue, and compliance is often reached at great expense of technical freedom, limiting the potential value of getting insights from a dataset.

Accordingly, a need exists for preventing access to sensitive data by users who have no jurisdictional access (e.g., from geographical locations that should not be allowed to access the data). The general data protection regulation ("GDPR") regulation, for example, requires appropriate safeguards for data transfers outside the European Union ("EU") and an administrator may desire to completely block the access to the data from outside the EU. In other examples, a dataset from another county may be unable to leave a machine they reside in, for lack of a better solution. In other cases, an administrator may want to allow access to the data from outside a designated region only in aggregated and/or anonymized form so that the privacy of the represented users is guaranteed. Thus, the present invention provides enhanced and durable safeguards to personal or sensitive data such that the personal or sensitive data is unable to be accessed by users not located in an allowed jurisdiction (e.g., a geographical location), unless specific measures (e.g., aggregation, anonymization) are in place. Accordingly, a need exists to provide regulation-based protection of data for storage systems in a computing environment.

Thus, the present invention provides regulation-based protection of data for storage systems in a computing environment in a computing system. Data may be received from a user. For example, the present invention protects personal, sensitive, and/or proprietary information by inspecting data upon receiving the data. One or more queries received by a storage system may be identified. Approval or denial of transmission of data with the storage system may be regulated in relation to the one or more queries based a queried metadata and a plurality of rules and administrative policies.

Additionally, present invention monitors each of the queries received by a storage system and govern the transmission of data in order to enforce compliance with existing regulations (e.g., privacy regulations being the most important). A machine learning component is provided to assist administrators in observing and/or detecting suspicious activities. In some implementations, based on policy requirements specified by a storage administrator, only users from certain areas/jurisdiction may be allowed to access raw data. Users from other jurisdiction may be allowed to access the data only in an aggregated form (e.g., only by using aggregation queries). Users from other jurisdiction may be allowed to access only a portion of the data (e.g., only by filtering on the non-sensitive part). In some implementations, the present invention enables and provides administrators access to additional layers of protection to ensure compliance with regulations.

For example, consider the following if a medical database requires several data tables such as: a number of data tables containing personal and sensitive information (e.g., PATIENTS table).

Other data tables containing generic data with no personal or sensitive information in (e.g., equipment_usage_history table). Due to local regulations, some attributes of the sensitive or personal data tables are intended to never leave a jurisdiction (e.g., cannot leave geographical boundaries).

Due to local regulations, the sensitive or personal data tables do not leave the jurisdiction, unless they are aggregated (with COUNT, STDDEV, or other aggregation functions). In some implementations, a database administrator is enabled to configure the database such that 1) some columns of a table (e.g., the PATIENTS table) should never be queried from connections incoming from outside a designed area/jurisdiction. Other columns of the table (e.g., the PATIENTS table) may be queried from connections incoming from outside the designed area/jurisdiction only if they are in an aggregated query such as COUNT, STDDEV. All columns from another table (e.g., EQUIPMENT_USAGE_HISTORY table) may be queried freely.

In general, as used herein, "optimize" may refer to and/or defined as "maximize," "minimize," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of preprocessing operations ("preprocessors") and/or machine learning models/machine learning pipelines, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
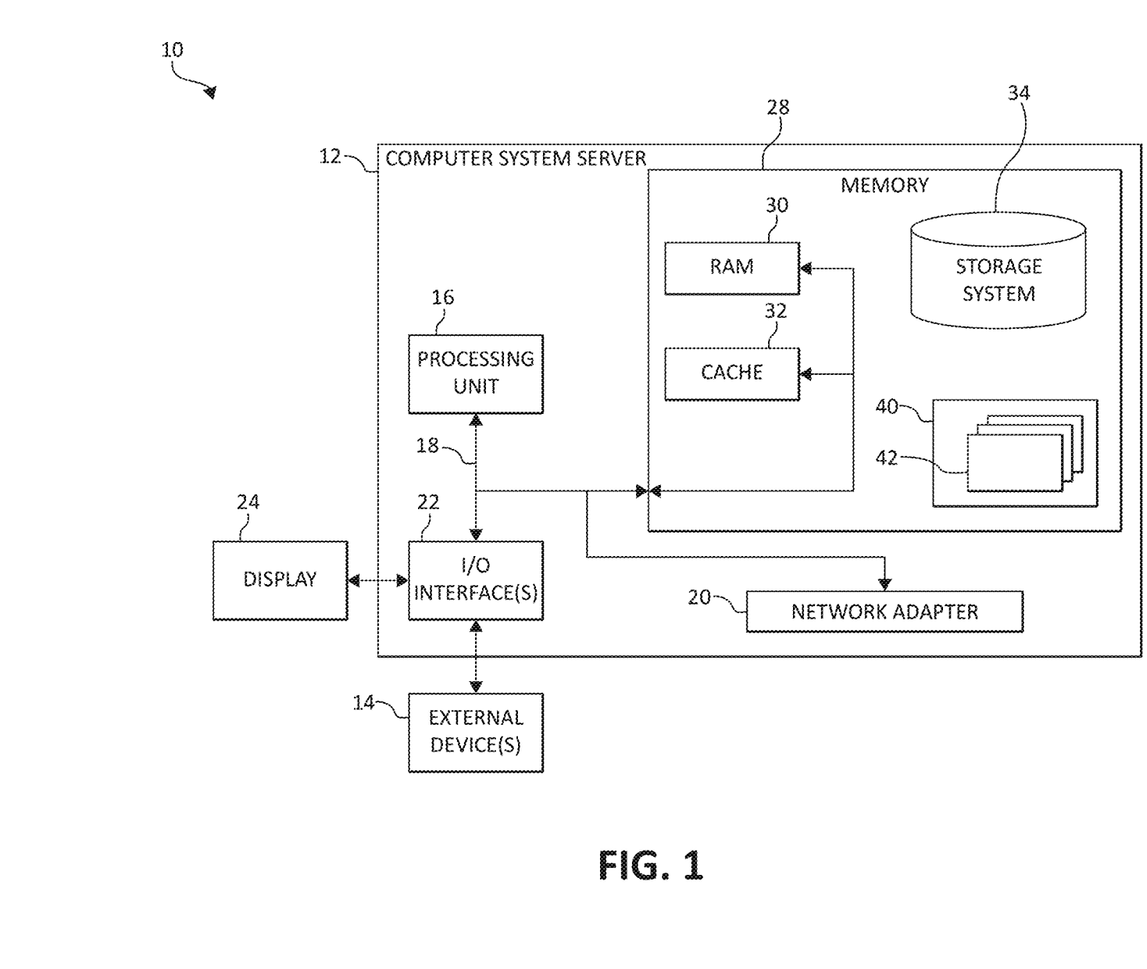
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
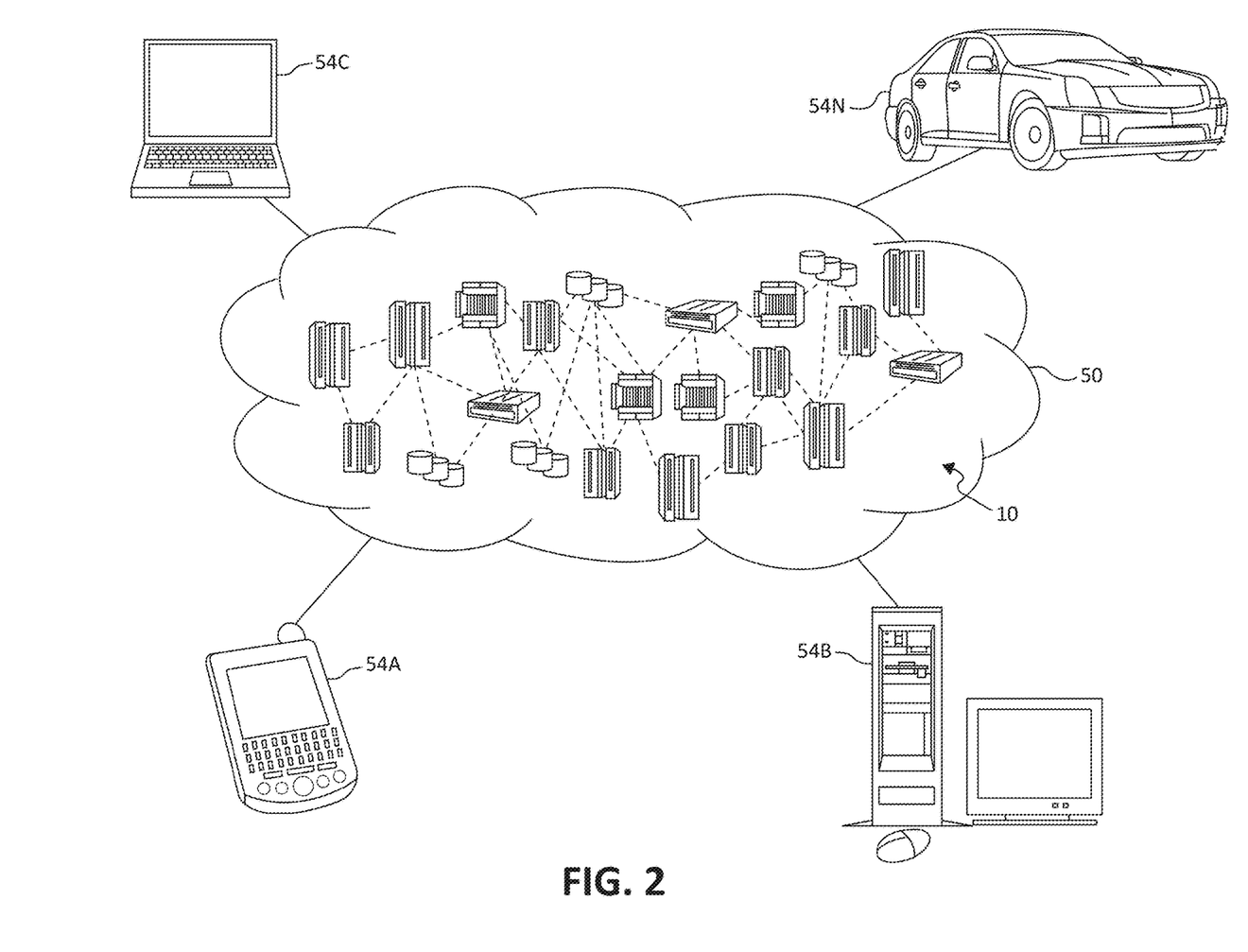
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
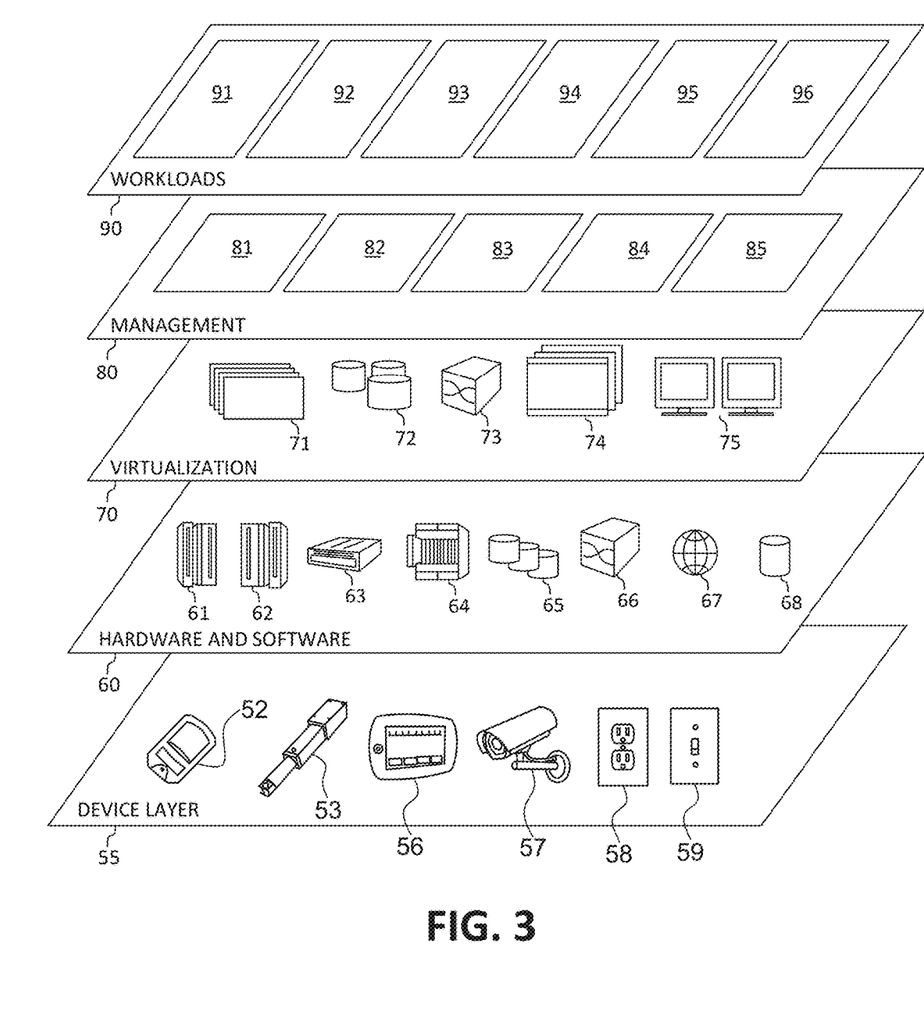
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing regulation-based protection of data for storage systems. In addition, workloads and functions 96 for providing regulation-based protection of data for storage systems may include such operations as data analysis (including data collection and processing) and data analytics functions. One of ordinary skill in the art will appreciate that the workloads and functions 96 for providing regulation-based protection of data for storage systems may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for real time context-based detection of data classification in a computing system.

In one aspect, the present invention may receive, interrupt, and/or intercept and act upon data prior to reaching a computing storage system/device. In one aspect, the data is analyzed and contextual information is collected learned, identified, processed, assembled, and/or built. For example, when a user enters data, collection of context may start immediately in real time.

Once enough context data is accumulated/built, the contextual information may be analyzed to determine the correct classification criteria to be applied (e.g., classifying the data as PII, SPI, classified, unclassified, etc., based on the identified/learned context). Once the classification criteria for classified data is applied, and determined to be protected and/or classified, the present invention further applies the classification criteria to classify data with enhanced classification (e.g., top-level classification or security). Thus, in one aspect, data may be first classified at a first-tier level of classification criteria such as, for example, data may be classified as PII or SPI. A second or "nth" tier level of classification criteria may also be applied such as, for example, the PII data of the first tier may also be classified according to the second or "nth" tier level such as, for example, the PII data is also "classified" or "confidential" according to certain laws, regulations, rules, or policies of country "A." Alternatively, the data may be past the first-tier level of classification (e.g., not considered as confidential), but may be considered as "classified" according to certain laws, regulations, rules, or policies of country "A" based on the second or "nth" tier level of classification criteria. Thus, the learned contextual information may be used to apply the various context-based classification criteria based on the particular context.

Figure 4:
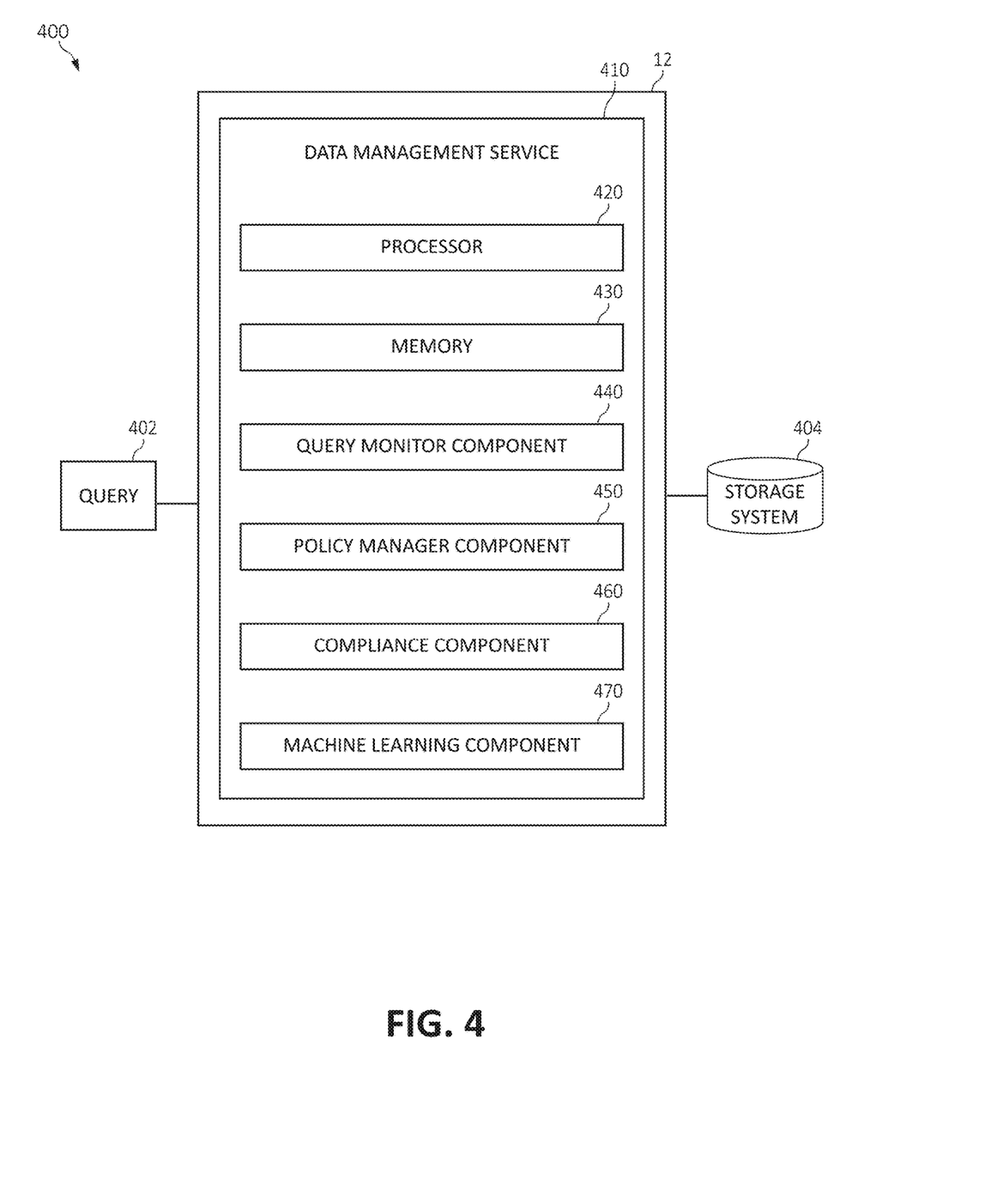
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown for preserving data security in a computing system. In one aspect, one or more of the components, modules, services, applications, and/or functions described in FIGS. 1-3 may be used in FIG. 4.

A data management service 410 is shown, incorporating processing unit 420 to perform various computational, data processing and other functionality in accordance with various aspects of the present invention. The data management service 410 may be included in computer system/server 12, as described in FIG. 1. The processing unit 420 ("processor") may be in communication with memory 430.

The data management service 410 may also include a query monitor component 440, a policy manager component 450, a policy manager component 460, knowledge manager component 480, and a machine learning component 490, each of which may be in communication with each other.

In one aspect, data management service 410 may in communication with and/or associated with one or more databases such as, for example, storage system 34 of FIG. 1, which may be internal to the data management service 410 or may be external to the data management service 410. For example, the storage system 34 of FIG. 1 may be a third-party database in communication with and/or associated with the data management service 410.

As one of ordinary skill in the art will appreciate, the depiction of the various functional units in data management service 410 is for purposes of illustration, as the functional units may be located within the data management service 410 or elsewhere within and/or between distributed computing components.

Responsive to receiving a query(s) 402 from a user and/or an enterprise, the query monitor component 440, which may employ the policy manager component 450, the policy manager component 460, the knowledge manager component 480, and/or the machine learning component 490, may monitor each query 402 and govern the transmission of data.

More specifically, in some implementations, the data management service 410, in association with the query monitor component 440, the policy manager component 460, the knowledge manager component 480, and/or the machine learning component 490 may identify the queries 402 received by and/or for the storage system 404 and regulate approval or denial of transmission of data with the storage system 404 in relation to the one or more queries 404 based a queried metadata and one or more rules and administrative policies.

In other implementations, the data management service 410, in association with the query monitor component 440, the policy manager component 460, the knowledge manager component 480, and/or the machine learning component 490 may fetch metadata and parse the one or more queries 402 where the metadata includes a least a geographical position of a user issuing the one or more queries, a query history, geographical positions of one or more servers, a user profile, privacy data, or a combination thereof.

The data management service 410, in association with the query monitor component 440, the policy manager component 460, the knowledge manager component 480, and/or the machine learning component 490 may define each of the plurality of rules and administrative policies. The data management service 410, in association with the query monitor component 440, the policy manager component 460, the knowledge manager component 480, and/or the machine learning component 490 may suggest one or more additional rules and administrative policies to update or replace one or more of rules and administrative policies.

In one aspect, data management service 410, in association with the query monitor component 440, the policy manager component 460, the knowledge manager component 480, and/or the machine learning component 490 may identify a geographical location/area and associate, assign, link, or tie each policy, rule, or combination thereof to the exact location/area (e.g., via an internet protocol ("IP") address) of a client connection so as to protect a database.

The data management service 410, in association with the query monitor component 440, the policy manager component 460, the knowledge manager component 480, and/or the machine learning component 490 may allow the transmission of the data based on feedback data.

The data management service 410, in association with the query monitor component 440, the policy manager component 460, the knowledge manager component 480, and/or the machine learning component 490 may identify one or more data patterns, user behavior patterns, or a combination thereof, and/or provide one or more alerts suggesting one or more additional rules and administrative policies based on the one or more data patterns, the user behavior patterns, or a combination thereof.

The data management service 410, in association with the query monitor component 440, the policy manager component 460, the knowledge manager component 480, and/or the machine learning component 490 may monitor and tracking the data associated with the storage system; and learn one or more data patterns, user behavior patterns, rules and administrative policies, and metadata a machine learning operation.

The data management service 410, in association with the query monitor component 440, the policy manager component 460, the knowledge manager component 480, and/or the machine learning component 490 may apply data security policies, rules, regulations, or a combination thereof relating to user criteria, data types and formats, data ownership, or a combination thereof for classifying data according to contextual classification criteria applied to contextual information.

The data management service 410, in association with the query monitor component 440, the policy manager component 460, the knowledge manager component 480, and/or the machine learning component 490 may also determine, confirm, re-classify, and/or transform (e.g., filter, anonymize, replace, data mask, etc.) the data and maintain the classified/private data (e.g., personal, sensitive, proprietary information) while maintaining and preserving the data/file format (e.g., preserve the data structure and size), which may be then be anonymized/filtered data.

The machine learning component 490 may learn the various types of private data (e.g., personal, sensitive, proprietary information) for each type of user and/or entity (e.g., government, business, organization, academic institution, etc.) and identify, detect, analyze, prevent leakage, and/or intercept classified/private data (e.g., personal, or sensitive information), and/or data patterns. In one aspect, machine learning component 490 may include and/or access a knowledge domain that may include a variety of knowledge data such as, for example, data relating to the various classified/private data for each type of user and/or entity (e.g., government, business, organization, academic institution, etc.).

In one aspect, the various machine learning operations of the machine learning component 490, as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

As one of ordinary skill in the art will appreciate, the data management service 410 may implement mathematical modeling, probability and statistical analysis or modeling, machine reasoning, probabilistic logic, text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Figure 5:
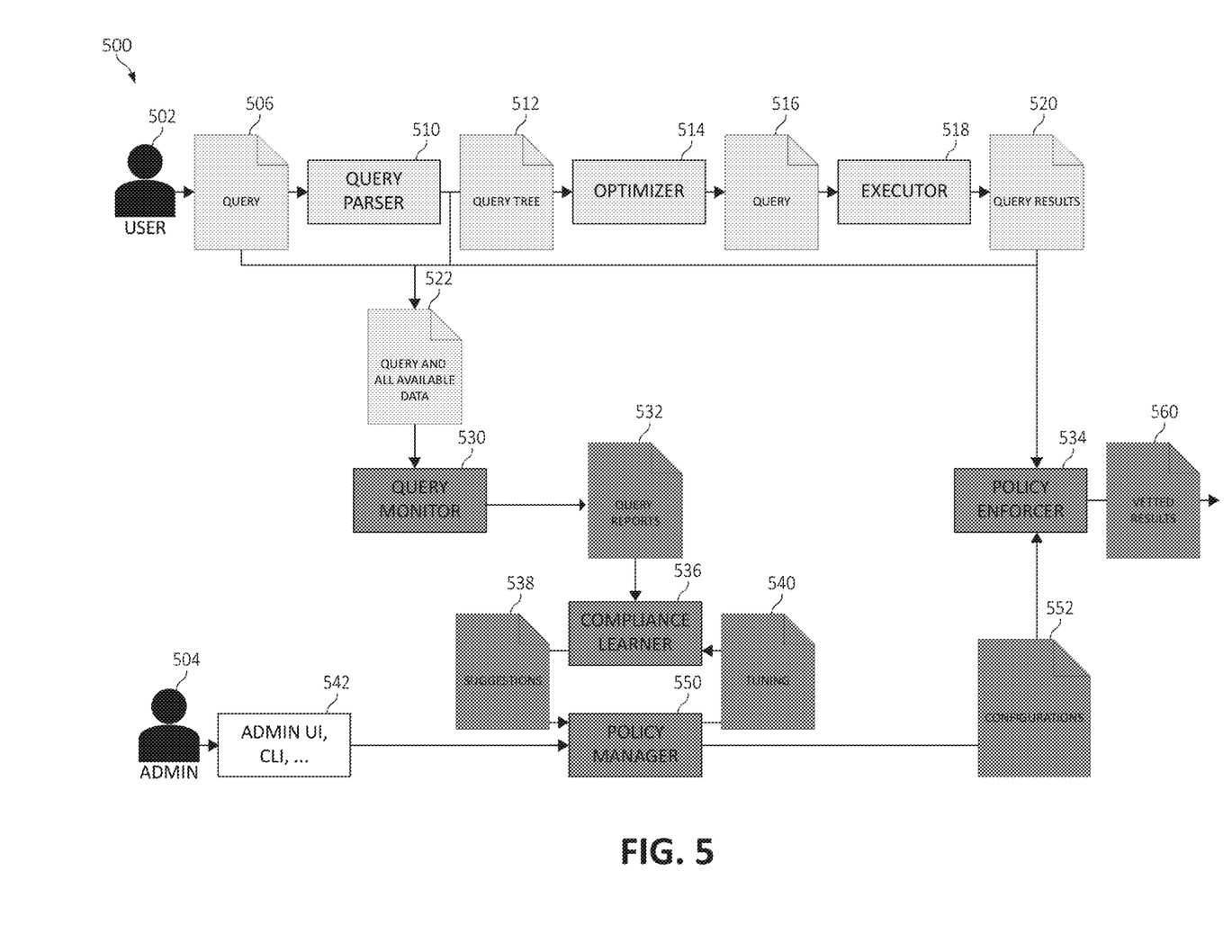
FIG. 5 is an additional block diagram depicting exemplary operations for providing regulation-based protection of data for storage systems in a computing environment according to an embodiment of the present invention.

For further explanation, FIG. 5 is an additional block diagram depicting exemplary operations for providing regulation-based protection of data for storage systems in a computing environment according to an embodiment of the present invention. Also, one or more components, functionalities, and/or features of FIGS. 1-4 may be implemented in FIG. 5. Repetitive description of like elements, components, modules, services, applications, and/or functions employed in other embodiments described herein is omitted for sake of brevity.

As shown, the various blocks of functionality are depicted with arrows designating the blocks' 500 relationships with each other and to show process flow. Additionally, descriptive information is also seen relating each of the functional blocks 500. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and generally unaware to the user performing.

Starting in block 502, a user 502 may issue a query 506 to a query parser 510. The query parser 510 may receive the query 506 for a storage system. The query parser 510 may send the query 506 to a query 512, which in turn sends the query 506 to the optimizer 514. The optimizer 514 may analyze and process the received query 510 and issue query 516 to the executor 518. The executor 518 may issue one or more query results 520.

It should be noted that the chain query parser 510, optimizer 514, and executor 518 is a standard pipeline in database system in order to first "understand" the query and then fetch the data. In order for the database to "understand" the query (which is written in something that vaguely resemble natural language), a "query tree" is needed, which is the output of the parser. In other words, a query enters the database (e.g., written in structured query language "SQL"), and then the parser will translate it into a query tree, which a database will be able to consume (e.g., it basically has all the required steps and dependencies among them). For example, assume a step such as, for example indicates "from table A get column price", "concatenate results from step 1 and step 2. Therefore, the whole picture is: 1) a query written in SQL language enters the database, and is translated into a query tree, 2) the query tree has all the required steps, but the steps are not optimized (e.g. changing order, discarding some parts, prioritizing cached steps, etc.), thus the optimizer 514 is used to understand how to better arrange the steps/operations, and 3) once the steps/operations are known and best arranged/optimized, the steps/operations can be actually executed on the data to have what the user asked for.

In some implementations, each of the blocks 506, 510, 512, 514, 516, 518, and 530 may be considered as part of a structured query language ("SQL") pipeline (e.g., the lighter shaded boxes). In other implementations, blocks 530-560 (the darker shaded boxes may be considered as essential and part of the novelty of the present invention.

The query parser 510 may also send the query 506 as a query and all available data0020 (e.g., the query and all available data and metadata 522) to the query monitor 530. The query monitor 530 is enabled to fetch all available metadata (e.g., geographic origin of the query, user profile, etc.) and parse the query 506 (e.g., which table are involved, if the query is providing an aggregated/grouped result or not)

The query monitor 530 may provide one or more query reports 532. The compliance learner 536 may receive and analyze each of the one or more query reports 532. One or more suggestions 538 may be provided to a policy manager 550.

The policy manager 550 provides and/or enables a user administrator 504 to define the user administrator's 504 own policies. The policy manager 550 may optionally include a wizard tool to assist the administrator 504 in writing their policies. The policy manager 550 may, optionally, include a wizard tool to assist the administrator 504 to monitor the data 532 (e.g., which may include data 522 and/or be a report of what is happing in the system only and may be a summary plus metadata) and suggest one or more new policies over the admin preferences 542 (e.g., first/last name should not leave the country, or a general box "GDPR compliance"). The policy manager 550 may provide to the compliance learner 536 tuning data for tuning, as in block 540.

If new data is added to the storage system (e.g., a new table containing credit card data), the new data may be assessed by the policy manager 550 so the administrator 504 can verify, validate, and/or analyze the query immediately. The policy manager 550, may optionally include a tool to govern multiple servers at the same time (e.g., in a federated environment). The policy manager 550 may also send to a policy enforcer 534 one or more configurations 552 for the data 522.

A policy enforcer 534 that allows or denies data transfer based on the policies defined in policy manager 550 applied to all the queries coming from the query monitor 530 and provides the results as vetted results 560. The policy enforcer 534, optionally, grants the administrator 504 and/or user 502 confirmation to access based on the feedback of the compliance learner 536 in (e.g., when a user 502 is quickly switching location, it could be either because of VPN). Thus, the policy enforcer 534 regulates approval or denial of transmission of data with the storage system in relation to the one or more queries based a queried metadata and a plurality of rules and administrative policies.

The compliance learner 536 provides and the user administrator 504 an assigned duty to review (or becomes the duty to review of the user administrator 504 due to compromised credentials). The compliance learner component 536 may observe the data from the query monitor 530, the policies in the policy manager 550 and the outcomes of the policy enforcer 534 (both of a provided in a server or of a plurality of servers such as, for example, in a federated environment), and observes patterns in the data 522 and/or user 502 and triggers alerts or suggests new policies to the storage administrator(s) 502, collecting feedback on decisions executed by the administrator 504.

Figure 6:
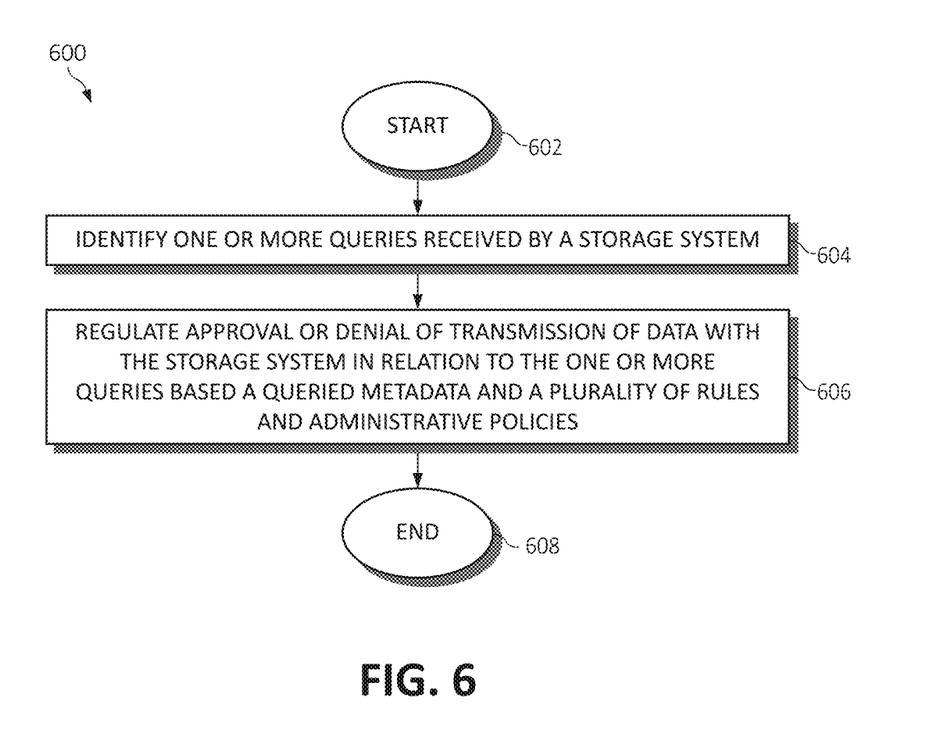
FIG. 6 is a flowchart diagram depicting an additional exemplary method for providing regulation-based protection of data for storage systems in a computing environment according to an embodiment of the present invention.

Turning now to FIG. 6, a method 600 for providing enhanced data protection for storage systems in a computing environment is depicted, in which various aspects of the illustrated embodiments may be implemented. The functionality 600 may be implemented as a method executed as instructions on a machine, where the instructions are included on at least one computer readable storage medium or one non-transitory machine-readable storage medium. The functionality 600 may start in block 602.

One or more queries received by a storage system may be identified, as in block 604. Approval or denial of transmission of data with the storage system may be regulated in relation to the one or more queries based a queried metadata and a plurality of rules and administrative policies, as in block 606. The functionality 600 may end in block 608.

In one aspect, in conjunction with and/or as part of at least one block of FIG. 6, the operations of 600 may include one or more of each of the following. The operations of 600 may fetch metadata and parsing the one or more queries, wherein the metadata includes a least a geographical position of a user issuing the one or more queries, a query history, geographical positions of one or more servers, a user profile, privacy data, or a combination thereof.

The operations of 600 may define and create each of the plurality of rules and administrative policies. The operations of 600 may suggest one or more additional rules and administrative policies to update or replace one or more of the plurality of rules and administrative policies. The operations of 600 may allow the transmission of the data based on feedback data. The operations of 600 may identify one or more data patterns, user behavior patterns, or a combination thereof; and provide one or more alerts suggesting one or more additional rules and administrative policies based on the one or more data patterns, the user behavior patterns, or a combination thereof.

The operations of 600 may monitor and tracking the data associated with the storage system; and learn one or more data patterns, user behavior patterns, rules and administrative policies, and metadata a machine learning operation. The operations of 600 may learn the contextual information from the data received from a user using a machine learning operation, wherein the data is structured data, unstructured data, or a combination thereof. The operations of 600 may apply, as the plurality of rules and administrative policies, a legal, ethical, moral, or jurisdictional rule or policy. Alternatively, the operations of 600 may apply, as the plurality of rules and administrative policies, data security policies, rules, regulations, or a combination thereof relating to user criteria, data types and formats, data ownership, or a combination thereof.

The operations of 600 may define the plurality of rules and administrative policies to include one or more legal, ethical, moral, or jurisdictional data security policies, rules, regulations, or a combination thereof, and/or define the plurality of rules and administrative policies to include data security policies, rules, regulations, or a combination thereof relating to user criteria, data types and formats, data ownership, or a combination thereof.

The operations of 600 may define the one or more data security policies or rules to include types and formats of data for preserving data security, define the one or more data security policies or rules to one or more operations to perform for preserving data security, and/or apply the one or more data security policies or rules to the write operation or the read operation using a machine learning operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for providing enhanced data protection for storage systems in a computing environment, comprising:

identifying one or more queries received by a storage system;

fetching metadata comprising a geographical position of a user issuing the one or more queries;

defining each of the plurality of rules and administrative policies, wherein the plurality of rules or administrative policies apply operations which comprise legal, ethical, moral, or jurisdictional rules or policies, and wherein the defining further comprises:

defining the plurality of rules and administrative policies to one or more operations to perform for preserving data security; and applying the plurality of rules and administrative policies to a write operation or a read operation using a machine learning operation;

parsing, concurrently to fetching the metadata, the one or more queries;

regulating approval or denial of transmission of data responsive to the one or more queries from the storage system a plurality of rules and administrative policies; and in response to approval of the transmission, transmitting the data.

2. The method of claim 1, wherein the metadata is further selected from a group consisting of a query history, geographical positions of one or more servers, and privacy data.

3. The method of claim 1, further including suggesting one or more additional rules and administrative policies to update or replace one or more of the plurality of rules and administrative policies.

4. The method of claim 1, further including allowing the transmission of the data based on feedback data.

5. The method of claim 1, further including:

identifying one or more data patterns, user behavior patterns, or a combination thereof; and providing one or more alerts suggesting one or more additional rules and administrative policies based on the one or more data patterns, the user behavior patterns, or a combination thereof.

6. The method of claim 1, further including:

monitoring and tracking the data associated with the storage system; and learning one or more data patterns, user behavior patterns, rules and administrative policies, and metadata a machine learning operation.

7. A system providing enhanced data protection for storage systems in a computing environment, comprising:

one or more computers with executable instructions that when executed cause the system to:

identify one or more queries received by a storage system; and fetch metadata comprising a geographical position of a user issuing the one or more queries;

define each of the plurality of rules and administrative policies, wherein the plurality of rules or administrative policies apply operations which comprise legal, ethical, moral, or jurisdictional rules or policies, and wherein the defining further comprises:

define the plurality of rules and administrative policies to one or more operations to perform for preserving data security; and apply the plurality of rules and administrative policies to a write operation or a read operation using a machine learning operation;

parse, concurrently to fetching the metadata, the one or more queries;

regulate approval or denial of transmission of data responsive to the one or more queries from the storage system a plurality of rules and administrative policies; and in response to approval of the transmission, transmit the data.

8. The system of claim 7, wherein the metadata is further selected from a group consisting of a query history, geographical positions of one or more servers, and privacy data.

9. The system of claim 7, wherein the executable instructions when executed cause the system to suggest one or more additional rules and administrative policies to update or replace one or more of the plurality of rules and administrative policies.

10. The system of claim 7, wherein the executable instructions when executed cause the system to allow the transmission of the data based on feedback data.

11. The system of claim 7, wherein the executable instructions when executed cause the system to:

identify one or more data patterns, user behavior patterns, or a combination thereof; and provide one or more alerts suggesting one or more additional rules and administrative policies based on the one or more data patterns, the user behavior patterns, or a combination thereof.

12. The system of claim 7, wherein the executable instructions when executed cause the system to:

monitor and tracking the data associated with the storage system; and learn one or more data patterns, user behavior patterns, rules and administrative policies, and metadata a machine learning operation.

13. A computer program product for providing enhanced data protection for storage systems in a computing environment, the computer program product comprising:

one or more computer readable storage media, and program instructions collectively stored on the one or more computer readable storage media, the program instruction comprising:

program instructions to identify one or more queries received by a storage system; and program instructions to fetch metadata comprising a geographical position of a user issuing the one or more queries;

program instructions to define each of the plurality of rules and administrative policies, wherein the plurality of rules or administrative policies apply operations which comprise legal, ethical, moral, or jurisdictional rules or policies, and wherein the defining further comprises:

program instructions to define the plurality of rules and administrative policies to one or more operations to perform for preserving data security; and program instructions to apply the plurality of rules and administrative policies to a write operation or a read operation using a machine learning operation;

program instructions to parse, concurrently to fetching the metadata, the one or more queries;

program instructions to regulate approval or denial of transmission of data responsive to the one or more queries from the storage system a plurality of rules and administrative policies; and in response to approval of the transmission, program instructions to transmit the data.

14. The computer program product of claim 13, wherein the metadata is further selected from a group consisting of a query history, geographical positions of one or more servers, and privacy data.

15. The computer program product of claim 13, further including program instructions to:
   suggest one or more additional rules and administrative policies to update or replace one or more of the plurality of rules and administrative policies.

16. The computer program product of claim 13, further including program instructions to allow the transmission of the data based on feedback data.

17. The computer program product of claim 13, further including program instructions to:
   identify one or more data patterns, user behavior patterns, or a combination thereof; and
   provide one or more alerts suggesting one or more additional rules and administrative policies based on the one or more data patterns, the user behavior patterns, or a combination thereof.

18. The computer program product of claim 13, further including program instructions to:
   monitor and tracking the data associated with the storage system; and
   learn one or more data patterns, user behavior patterns, rules and administrative policies, and metadata a machine learning operation.

\* \* \* \* \*